United States Patent
McMurtry

(10) Patent No.: US 8,074,369 B2
(45) Date of Patent: Dec. 13, 2011

(54) PIVOT JOINT

(75) Inventor: David Roberts McMurtry, Gloucestershire (GB)

(73) Assignee: Renishaw PLC, Wotton-Under-Edge (GB)

( * ) Notice: Subject to any disclaimer, the term of this patent is extended or adjusted under 35 U.S.C. 154(b) by 0 days.

(21) Appl. No.: 12/457,891

(22) Filed: Jun. 24, 2009

(65) Prior Publication Data

US 2009/0269128 A1    Oct. 29, 2009

Related U.S. Application Data

(63) Continuation of application No. 11/798,462, filed on May 14, 2007, now Pat. No. 7,568,854, which is a continuation of application No. 10/752,680, filed on Jan. 8, 2004, now Pat. No. 7,241,070, which is a continuation-in-part of application No. PCT/GB02/03294, filed on Jul. 15, 2002.

(30) Foreign Application Priority Data

Jul. 13, 2001  (GB) .................................. 0117098.4
Jan. 15, 2003  (GB) .................................. 0300839.8
Aug. 20, 2003  (GB) .................................. 0319532.8

(51) Int. Cl.
G01B 5/008    (2006.01)
F16C 11/06    (2006.01)
(52) U.S. Cl. .......................... 33/503; 33/573; 74/479.01
(58) Field of Classification Search .................... 33/503, 33/1 M, 572, 573; 74/479.01, 490.01, 490.05, 74/490.06; 108/4, 7, 8; 248/163.1, 394; 250/442.11; 269/71
See application file for complete search history.

(56) References Cited

U.S. PATENT DOCUMENTS

| | | | |
|---|---|---|---|
| 1,086,375 A | | 2/1914 | Lafrance |
| 1,431,208 A | | 10/1922 | Austin |
| 1,446,811 A | | 2/1923 | Rowland |
| 2,324,803 A | | 7/1943 | Snyder |
| 2,674,501 A | | 4/1954 | Biegler |
| 2,841,427 A | | 7/1958 | Sheppard |
| 3,288,421 A | * | 11/1966 | Peterson ...................... 248/396 |
| 3,490,798 A | | 1/1970 | Spyra |
| 3,577,659 A | * | 5/1971 | Kail ............................... 434/58 |
| 3,691,788 A | | 9/1972 | Mazziotti |
| 4,338,038 A | | 7/1982 | Cloarec |

(Continued)

FOREIGN PATENT DOCUMENTS

DE    3818254 A1    1/1989

(Continued)

OTHER PUBLICATIONS

Jul. 27, 2010 Office Action issued in Japanese Application No. 2004-566157 (with translation).

Primary Examiner — R. Alexander Smith
(74) Attorney, Agent, or Firm — Oliff & Berridge, PLC

(57) ABSTRACT

A pivot joint has a first structure comprising a ball mounted in a receptacle, wherein the location of the ball is held with respect to the receptacle, and a second structure mounted on and movable with respect to the ball, wherein the second structure has at least one bearing surface which defines its position with respect to the ball. The ball may be held in location by contact with the receptacle at at least two positions. At least one of the positions of contact may be adjustable.

20 Claims, 9 Drawing Sheets

U.S. PATENT DOCUMENTS

| | | | |
|---|---|---|---|
| 4,465,394 A * | 8/1984 | Berthold | 403/122 |
| 4,466,631 A * | 8/1984 | Berg | 172/439 |
| 4,607,578 A * | 8/1986 | Inoue et al. | 108/145 |
| 4,667,922 A * | 5/1987 | Cutburth et al. | 248/664 |
| 4,819,496 A * | 4/1989 | Shelef | 74/490.03 |
| 4,826,342 A | 5/1989 | Fujita | |
| 5,451,134 A * | 9/1995 | Bryfogle | 414/680 |
| 5,461,515 A * | 10/1995 | Sorce | 359/872 |
| 5,489,168 A * | 2/1996 | Sheldon et al. | 409/235 |
| 5,544,767 A | 8/1996 | Daugherty, Jr. | |
| 5,558,238 A | 9/1996 | Daugherty, Jr. | |
| 5,568,993 A | 10/1996 | Potzick | |
| 5,604,593 A * | 2/1997 | McMurtry | 356/496 |
| 5,653,548 A * | 8/1997 | Amdahl | 403/133 |
| 5,681,981 A * | 10/1997 | McMurtry | 73/1.73 |
| 5,865,063 A * | 2/1999 | Sheldon | 74/490.01 |
| 5,941,128 A * | 8/1999 | Toyama et al. | 74/490.06 |
| 6,021,579 A * | 2/2000 | Schimmels et al. | 33/645 |
| 6,086,283 A * | 7/2000 | Ziegert | 403/57 |
| 6,100,534 A * | 8/2000 | Honma et al. | 250/442.11 |
| 6,113,301 A * | 9/2000 | Burton | 403/122 |
| 6,290,196 B1 * | 9/2001 | Mayenberger | 248/274.1 |
| 6,361,238 B1 | 3/2002 | Schittl et al. | |
| 6,390,313 B1 | 5/2002 | Ring et al. | |
| 6,398,656 B1 * | 6/2002 | Michioka et al. | 464/106 |
| 6,425,177 B1 * | 7/2002 | Akeel | 29/714 |
| 6,431,987 B1 * | 8/2002 | Tushar et al. | 464/112 |
| 6,477,912 B2 * | 11/2002 | Song et al. | 74/490.06 |
| 6,575,676 B2 * | 6/2003 | Wang et al. | 409/201 |
| 6,662,461 B2 * | 12/2003 | McMurtry | 33/558.2 |
| 7,275,332 B2 * | 10/2007 | Blanding | 33/568 |
| 7,498,758 B2 * | 3/2009 | Baba et al. | 318/568.12 |
| 7,530,542 B2 * | 5/2009 | Boyce et al. | 248/371 |
| 2004/0079844 A1 * | 4/2004 | Bailey | 248/127 |
| 2011/0032090 A1 * | 2/2011 | Provancher | 340/407.1 |
| 2011/0118738 A1 * | 5/2011 | Vasta et al. | 606/56 |

FOREIGN PATENT DOCUMENTS

| | | |
|---|---|---|
| DE | 43 33 913 A1 | 4/1994 |
| DE | 199 38 242 C1 | 6/2001 |
| EP | 763708 A2 * | 3/1997 |
| FR | 947 212 | 6/1949 |
| FR | 2 757 440 | 6/1998 |
| GB | 2 205 146 A | 11/1988 |
| GB | 2 273 043 A | 6/1994 |
| JP | 51-35852 | 9/1974 |
| JP | 62-23331 | 2/1987 |
| JP | 63-00621 I | 1/1988 |
| JP | 01-255720 | 10/1989 |
| JP | 3-74776 | 7/1991 |
| JP | A-2000-334730 | 12/2000 |
| WO | WO 95/20747 | 8/1995 |
| WO | WO 9618045 A2 * | 6/1996 |
| WO | WO 2005036000 A2 * | 4/2005 |

* cited by examiner

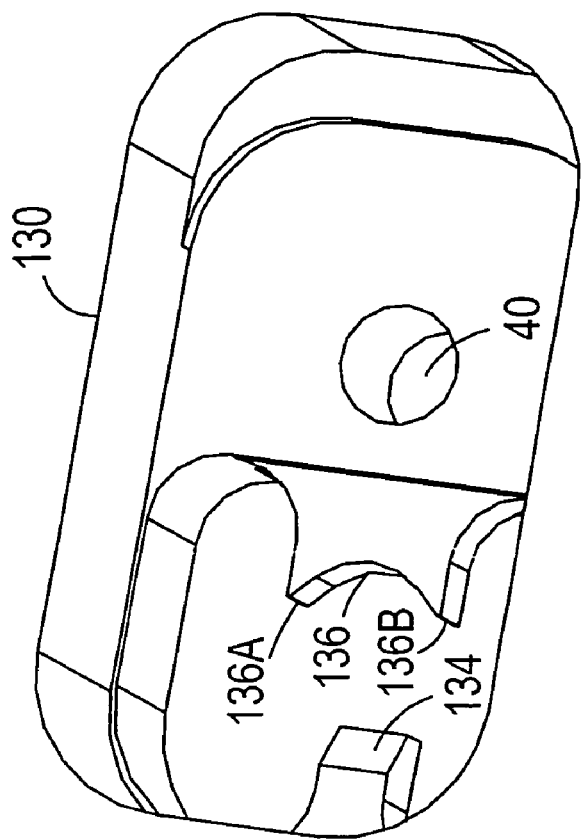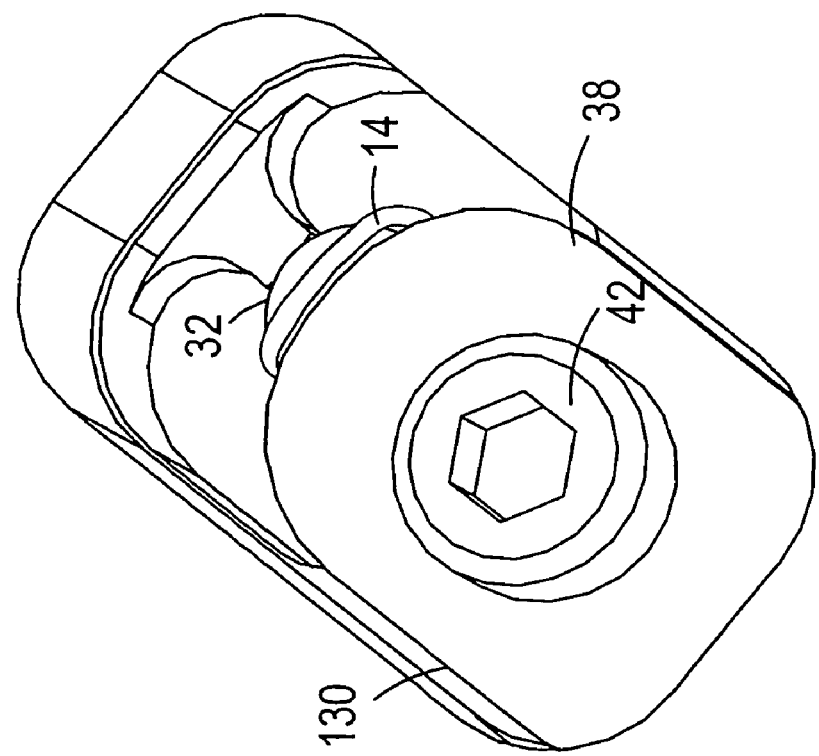
Fig 9

PIVOT JOINT

This is a Continuation of application Ser. No. 11/798,462 filed May 14, 2007, now U.S. Patent No. 7,568,854, which is a Continuation of application Ser. No. 10/752,680 filed Jan. 8, 2004, that issued as U.S. Pat. No. 7,241,070, which in turn is a Continuation-in-Part of International Application No. PCT/GB02/03294 filed Jul. 15, 2002. The disclosure of the prior applications is hereby incorporated by reference herein in its entirety.

BACKGROUND

The present invention relates to a pivot joint, in particular a high precision ball joint.

Pivot joints which comprise a ball on a stalk are known. In such pivot joints the ball is located within a socket with the stalk protruding from the socket. These pivot joints have the disadvantage that they are not high precision, particularly because the ball part is not accurately spherical. A further disadvantage is that parts cannot be cheaply replaced when worn. As such joints wear, their positional accuracy decreases which can result in undesirable movement at the pivot point.

Accurate spheres (i.e. ball bearings) can be made very precisely by a lapping process.

SUMMARY

In a first aspect the present invention provides a pivot joint comprising:

a first structure comprising a ball mounted in a receptacle, wherein the location of the ball is held with respect to the receptacle; and a second structure mounted on and movable with respect to the ball, wherein the second structure has at least one bearing surface which defines its position with respect to the ball.

The ball is preferably held in location by contact with the receptacle at least two positions.

The at least two positions of contact are preferably on opposite sides of the ball. They may be diametrically opposite, but this is not essential and in some circumstances, for example where a precision joint is required it is preferred that the positions of contact are formed as the apexes of triangles whose centre passes through the ball.

Preferably, the second structure is captured between the receptacle and the ball. Thus, the receptacle and second structure are interconnected via the ball. In this configuration, at least one contact is on either side of the second structure i.e. at least one contact is on each side of the bearing surface which defines the position of the second structure with respect to the ball.

In a preferred embodiment, at least one of the positions of contact is adjustable.

Preferably the ball is held or fixed in location by at least four points of contact with the first structure.

When the ball is held in location, it may be movable with respect to the receptacle as well as the second.

However, when a high precision joint is required, the ball needs to be stationary with respect to the first structure and thus is fixed in position.

By having at least one adjustable position of contact, either of these states may be used, as required.

Alternatively, the ball is held in location with respect to the first structure or fixed by a conical recess and at least one point of contact.

Preferably the second structure has three bearing surfaces. Alternatively the second structure may have two bearing surfaces.

In a preferred embodiment, the second structure is biased into contact with the ball. Such a bias may be provided by a spring, magnetic force, a pressure differential (e.g. vacuum) or elastic band, for example.

A second aspect of the invention provides a method of holding a location of a ball with respect to a structure wherein the ball is sited in said location by contacting the structure at least two positions.

Preferably, the at least two positions are on opposite sides of the ball.

In preferred embodiments the ball is fixed or held in location by at least four points of contact or, alternatively, by a conical recess and at least one point of contact.

A third aspect of the invention provides a method of locating a structure on a ball wherein the structure is movable with respect to the ball, the structure comprising an aperture with a peripheral surface for receiving the ball wherein at least one area of the peripheral surface is configured to be in sliding contact with the ball.

Preferably, at least two areas of the peripheral surface are configured to be in sliding contact with the ball and areas of the peripheral surface between said at least two areas are configured not to be in contact with the ball.

A fourth aspect of the invention provides a pivot joint comprising:

a first structure comprising a ball retained in a receptacle; and a second structure movable with respect to the first structure and in contact with the ball via a bearing, the contact defining location of a pivot point characterised in that:

the bearing is shaped to receive the ball wherein, as the bearing wears, the pivot point is substantially maintained in its defined location.

An advantage of a pivot joint according to the invention is that undesirable movement in the plane of the pivot joint is mitigated thus the joint has minimal longitudinal movement and the overall length of the structures connected via the pivot joint remains substantially the same over time. This means that the joint is less susceptible to the effects of wear and may remain within tolerance levels for longer increasing either the lifetime of the joint or the time between the replacement of parts of the joint.

Preferably, a bias is used to help to ensure that the second structure is at least partially received on the bearing at the correct position. This will result in the wearing process on the bearing occurring at the desired places in order to maintain the pivot point at substantially its defined location.

The ball is preferably a precision ball for example a lapped ball such as a ball bearing. The ball, even when retained in the receptacle, is independent i.e. not fixed in location by use of a screw, stud or other means which affects sphericity of the ball and thus accuracy. Such an independent ball may act as a precision bearing and in addition, provides the location point of the joint. The ball is retained in the receptacle by clamping, gluing, welding or braising for example, other methods which do not distort the shape of the ball are also appropriate.

Ball bearings with highly spherical surfaces can be used to produce a smooth and precise motion between two structures that have not undergone expensive accurate machining processes. One of the reasons that these pivot joints are so accurate is because the ball may be held or fixed in location without the use of a screw stud which would affect the sphericity and smoothness of the ball surface and joint movement.

In a preferred embodiment, there is provided a third structure moveable with respect to the first and second structures whereby the third structure is in contact with the ball via a further bearing, the contact defining the location of a pivot point which is substantially maintained in its defined location as the bearing surface wears.

The bearing may comprise an air bearing, a roller bearing or a plane bearing. Thus, the bearing may be provided by a surface of the first (and third) structure. Alternatively, a separate bearing, for example comprising a number of ball bearings in a race, provides the contact between the structures.

Pivot joints according to the invention enable the production of (high) precision joints at low cost.

BRIEF DESCRIPTION OF DRAWINGS

Embodiments of the invention will now be described by way of example and with reference to the accompanying drawings in which:

FIG. 9 is an isometric view of the upper stage of the coordinate measuring machine, showing alternative pivot joints;

FIG. 10d shows a cross-section through plane A-A of the pivot joint shown in FIG. 10a.

DETAILED DESCRIPTION OF EMBODIMENTS

Figure 1:
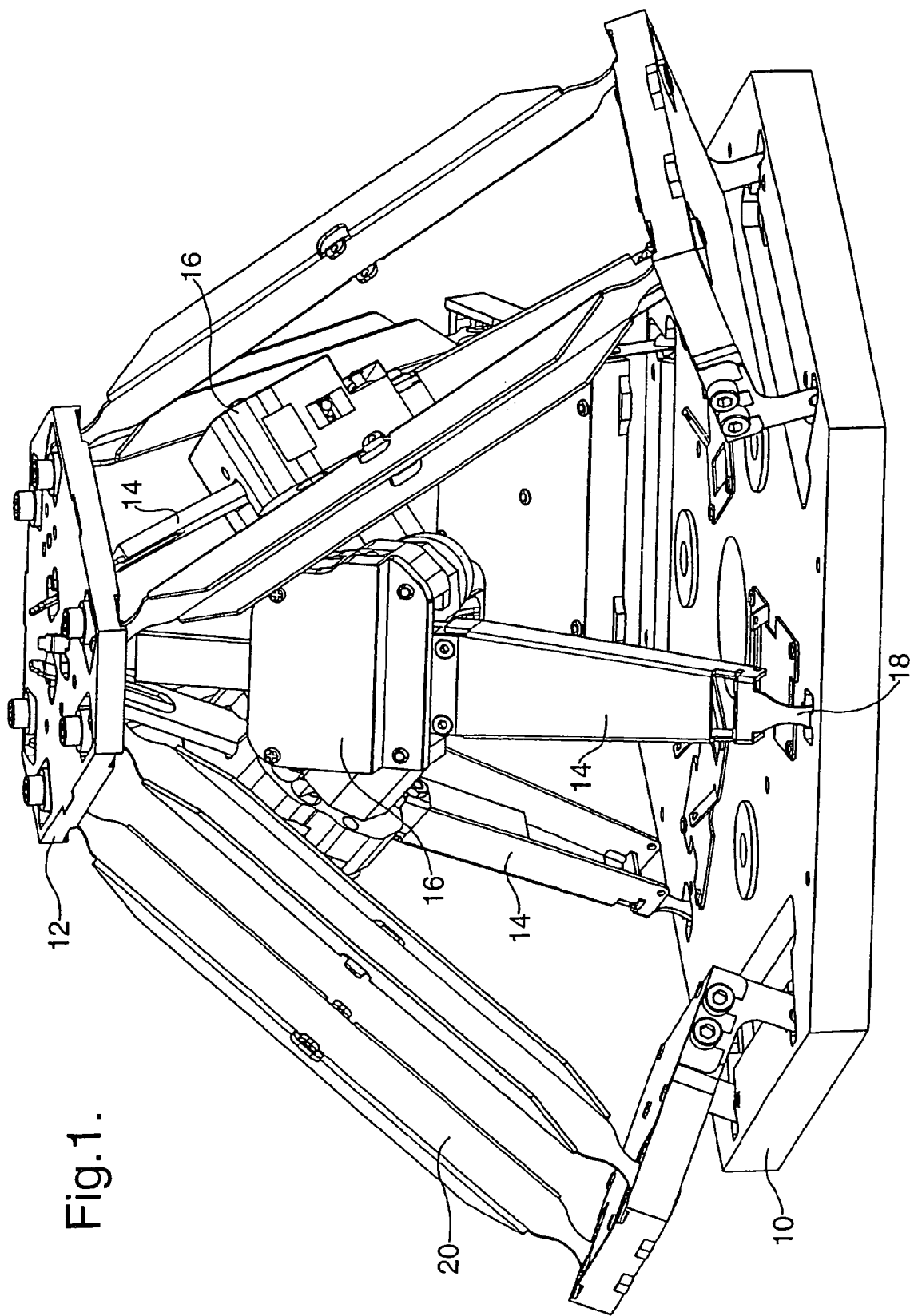
FIG. 1 is an isometric view of a coordinate measuring machine using the pivot joint of the invention.

A coordinate measuring machine using pivots joints according to the invention is shown in FIG. 1. The coordinate measuring machine comprises a lower fixed stage 10 and an upper movable stage 12. The upper and lower stages are linked by telescopic struts 14, each strut being connected to the upper and lower stages at its respective upper and lower ends by pivot joints 18. Each strut has a motor 16 to increase or decrease its length.

A coordinate measuring machine using pivots joints according to the invention is shown in FIG. 1. The coordinate measuring machine comprises a lower fixed stage 10 and an upper movable stage 12. The upper and lower stages are linked by telescopic struts 14, each strut being connected to the upper and lower stages at its respective upper and lower ends by pivot joints. Each strut has a motor 16 to increase or decrease its length.

As the upper stage 12 is supported only by the three telescopic struts 14 which are connected to the upper and lower stages by pivot joints 18, this stage may rotate about three perpendicular axes relative to the lower stage 10. To prevent this, three anti-rotational devices 20 are provided which eliminate these three degrees of rotational freedom whilst allowing translational movement. The devices are passive, i.e. they have no motor or other actuator. The joints between the anti-rotational devices 20 and the upper and lower stages 12,10 are also pivot joints. The upper stage 12 comprises the receptacles and balls (first structures) for a number of pivot joints. Each strut 14 and anti-rotational device 20 forms a second structure (it is not essential for all the joints to be according to the invention).

As the upper stage 12 is supported only by the three telescopic struts 14 which are connected to the upper and lower stages by pivot joints, this stage may rotate about three perpendicular axes relative to the lower stage 10. To prevent this, three anti-rotational devices 20 are provided which eliminate these three degrees of rotational freedom whilst allowing translational movement. The devices are passive, i.e. they have no motor or other actuator. The joints between the anti-rotational devices 20 and the upper and lower stages 12,10 are also pivot joints. The upper stage 12 comprises the receptacles and balls (first structures) for a number of pivot joints. Each strut 14 and anti-rotational device 20 forms a second structure (it is not essential for all the joints to be according to the invention).

Figure 2:
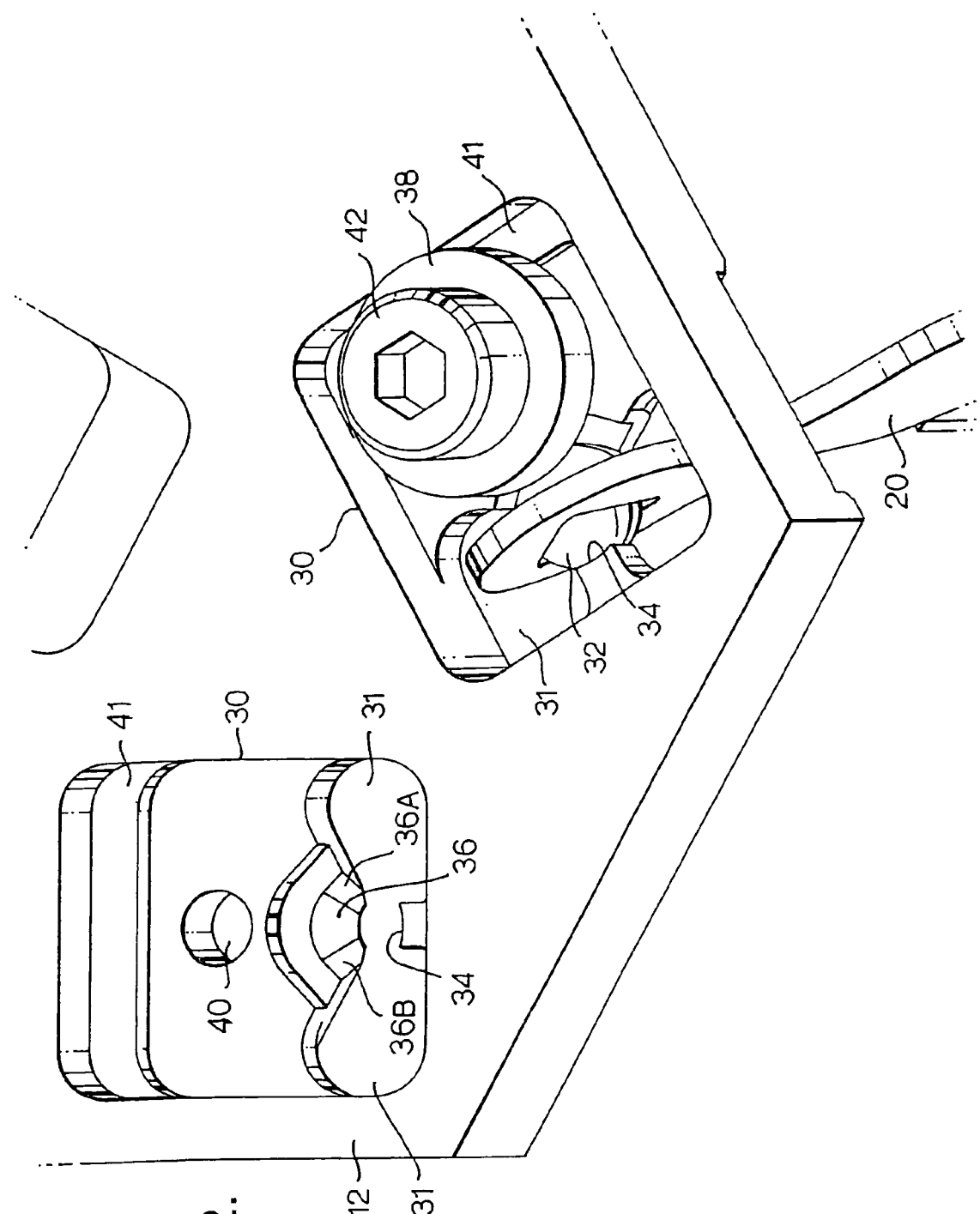
FIG. 2 is an isometric view of the upper stage of the coordinate measuring machine, showing the pivot joints.
Figure 4:
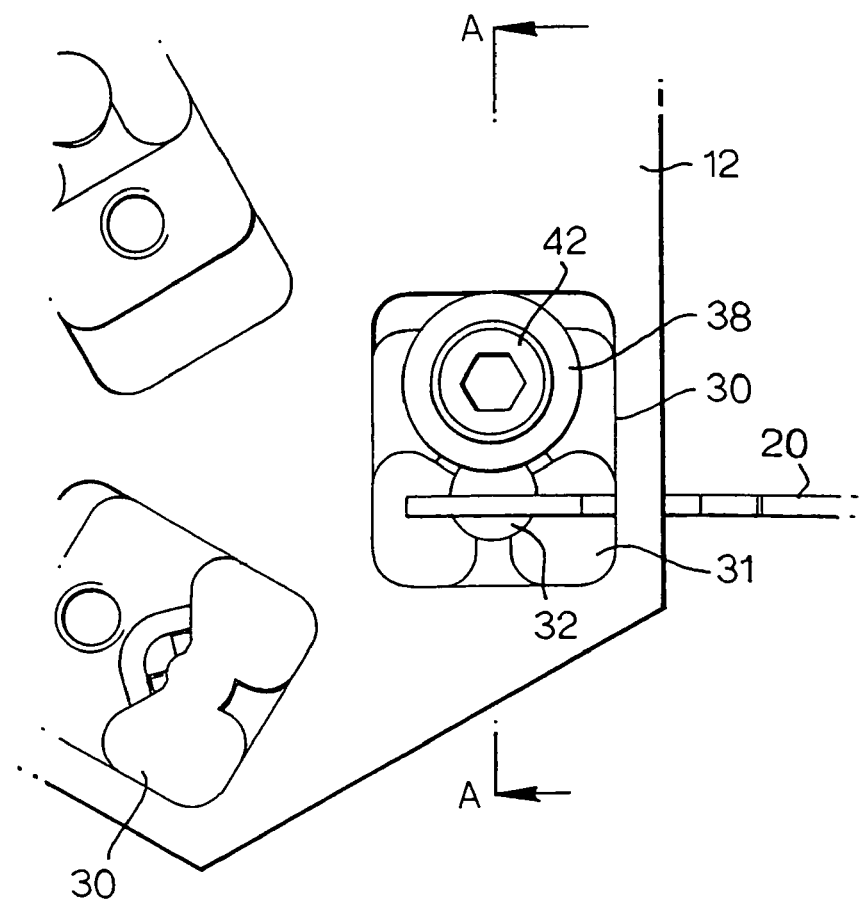
FIG. 4 is a plan view of the upper stage of the coordinate measuring machine, showing the pivot joint.
Figure 5:
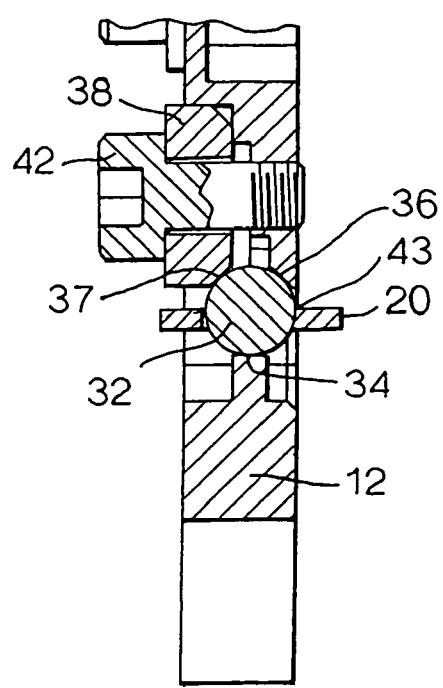
FIG. 5 is a section along line A-A of FIG. 4.

A pivot joint between the upper stage 12 and an anti-rotational device 20 is shown in more detail in FIGS. 2, 4 and 5. The upper stage 12 is provided with structured cut-outs 30. A ball 32 of the pivot joint is supported within the cut-out 30 by surfaces defining the periphery of the cut-out 30. Thus, the first structure is provided by the upper stage plus the ball. Two cut-outs 30 are shown in FIG. 2, one with the other components of the ball joint in place and the other without.

The ball 32 is supported by two opposite surfaces 34,36 of the cut-out 30. A first curved surface 34 contacts a side of the ball 32, and a second curved surface 36 contacts a lower surface of the ball 32 with two points of contact 36A,36B. The position of the ball 32 is defined by these three points of contact 34,36A,36B and a fourth point of contact provided by a clamp 38,42. The ball is thus kinematically and repeatably located within the cut-out.

In this example the clamp comprises a washer 38 and a fixing device 42, such as a screw or bolt. The washer 38 sits on a shelf 41 provided in the cut-out 30 in the upper stage 12, an edge of its lower surface in contact with the ball 32. The upper stage 12 is provided with a hole 40 aligned with the centre of the washer 38, to receive the fixing device 42 which holds the washer 38 against the ball 32. The ball 32 is thus held rigidly in a fixed position at four places around its surface by the first curved surface 34, by two points of contact 36A, B on the second curved surface 36, and by the washer 38.

An alternative pivot joint between the upper stage 12 and a strut 14 is shown in FIG. 9. The upper stage 12 is provided with structured cut-outs 130. A ball 32 of the pivot joint is supported within the cut-out 130 by surfaces defining the periphery of the cut-out 130. Two cut-outs 130 are shown in FIG. 9, one with the other components of the ball joint in place and the other without.

The ball 32 is supported by two opposite surfaces 134,136 of the cut-out 130. A first curved surface 134 contacts a lower surface of the ball 32, and a second curved surface 136 contacts a side of the ball 32 with two points of contact 136A, 136B. The position of the ball 32 is defined by these three points of contact 134,136A,136B and a fourth point of contact provided by a clamp 38,42.

The orientation of the contacting surfaces, for the cut-out 130 are rotated with respect to the cut-out 30 as the orientation of the strut 14 is rotated with respect to anti-rotational device 20. This can be seen in FIG. 1.

Figure 3:
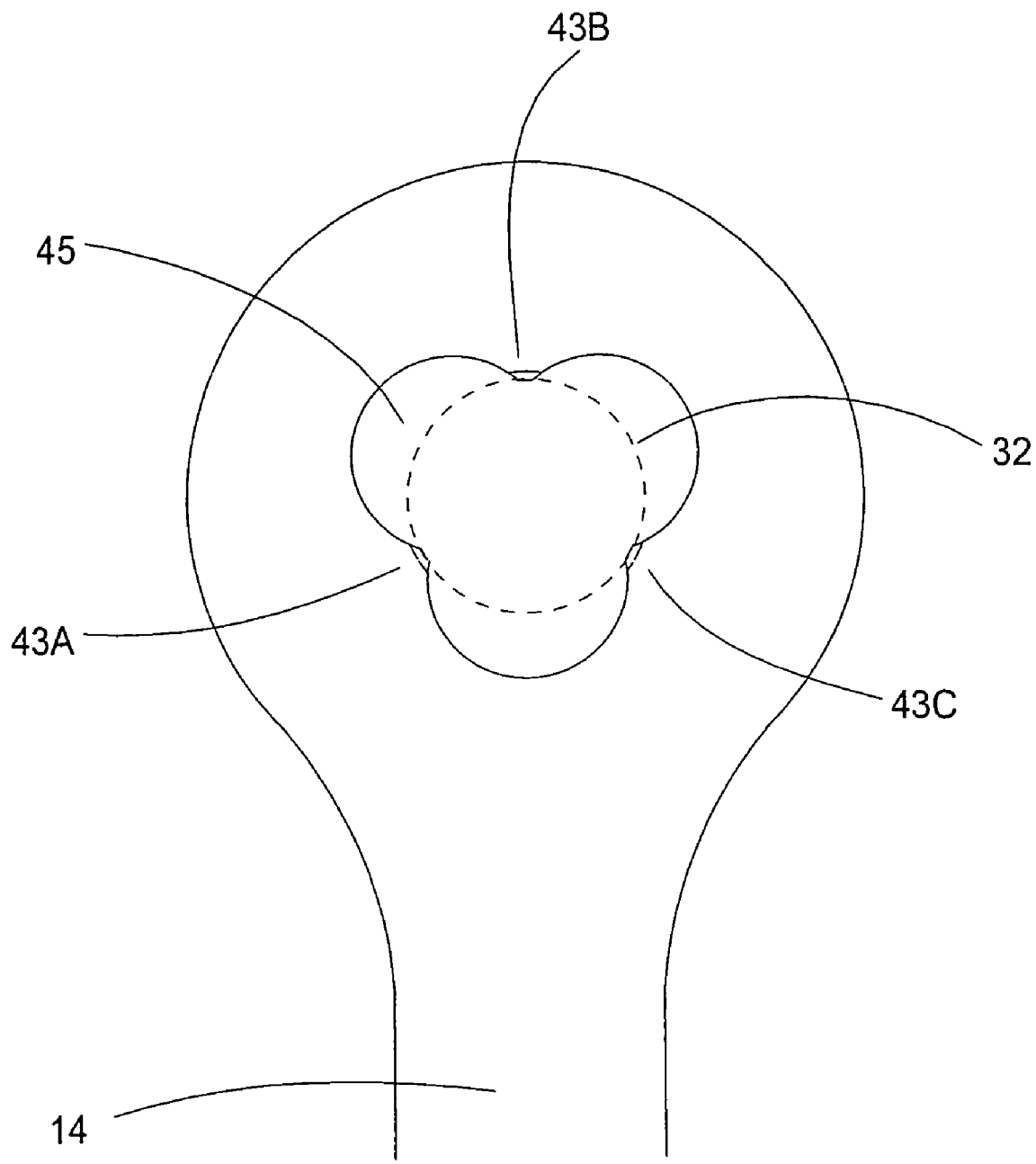
FIG. 3 is a plan view of one end of a strut of the coordinate measuring machine.

Each end of each of the telescopic struts 14 and anti-rotational devices 20 is provided with a hole 45 which fits over a ball 32 of a respective pivot joint. Each hole 45 is shaped to have three bearing surfaces 43A, B, C, spaced at 120° apart, as shown in FIG. 3. Only the three bearing surfaces are in contact with the ball 32.

These bearing surfaces have small areas of contact with the ball 32 to maximise slide between the surfaces.

These small areas of contact also provide repeatable positioning of the strut 14 or anti-rotational device 20 with respect to the ball 32.

For FIG. 3, the three bearing surfaces are planar through the thickness of the structure and curved through the plane of the structure so as to describe part of a cone which has a surface defined by the bearing surfaces i.e. they are conical in shape. The ball sits on these three small areas of contact.

A second structure 20 is provided with a hole 45 which partly receives and fits over a ball 32 of a respective joint.

The ball is retained in a receptacle and acts as a precision surface for the centre of the bearing and, in addition, the ball provides the link between the two parts of the joint.

Although the examples show the second structure 14,20 encircling the ball 32, this is not essential. Thus, the second structure may substantially encircle the ball with a gap in the structure (the limiting size of any gap is a function of the diameter of the ball and the position of the bearing surfaces of the second structure).

It should be noted that whilst it is preferred that both the struts 14 and anti-rotational devices 20 have pivot joints according to the invention, this is not essential.

Figure 6A:
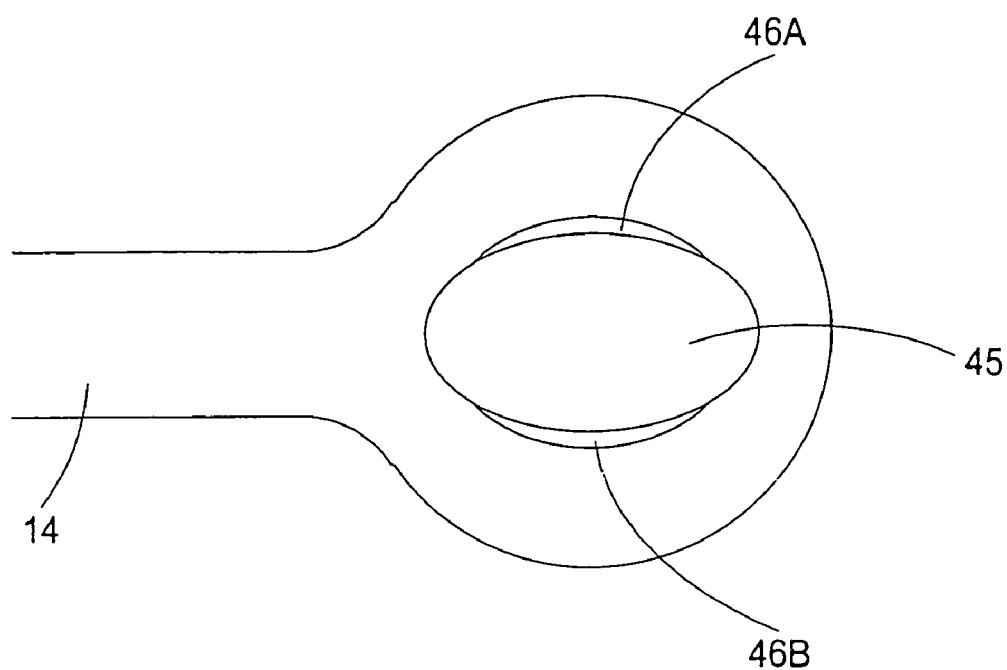
FIGS. 6a and 6b are views of an end of an alternative strut of the coordinate measuring machine.

FIG. 6a shows an alternative arrangement of the bearing surfaces. In this arrangement the hole 45 is oval with only two bearing surfaces 46A,46B. As the bearing surfaces wear, they sit further down onto the surface of the ball, thus reducing rattle between the bearing surfaces and the ball. This arrangement is particularly suitable when the force on the bearing surface is parallel to an axis perpendicular to the plane of the bearing surfaces (for example if the ball joint is used in a jack).

Figure 6B:
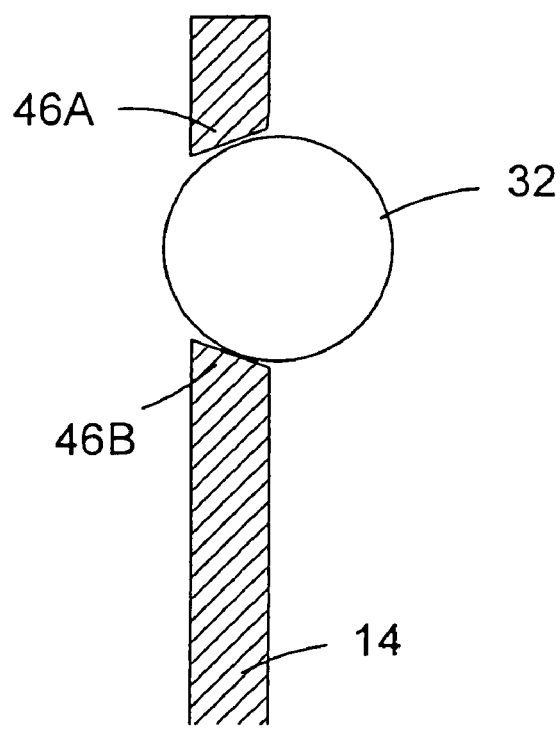

For FIG. 6, the two bearing surfaces are curved in two dimensions. Firstly through the thickness of the second structure to partially receive the ball (FIG. 6b) and, secondly in the longitudinal direction of the structure (FIG. 6a) where the width of the bearing surfaces is at a maximum at the position where it is desired to seat the ball (in this case this is central to the oval aperture) tapering off either side of this desired position. This tapering encourages the ball to seat in the desired position.

The struts 14 and anti-rotational devices 20 are formed from a good bearing material, such as phosphor bronze. The strut 14 may be made by etching and then machining or stamping the holes 45 to accurately control the length and geometry of the holes 45.

A side view of the upper stage 12 with an anti-rotational device 20 mounted on a pivot joint is shown in FIG. 5 which is a section along line A-A of FIG. 4. The ball 32 can be seen to be held in position by three of the four points of contact. These are the first curved surfaces 34 and two points of contact on the second curved surface 36 provided on the stage 12 and the surface 37 of the washer 38. These surfaces are shown to be spaced around the circumference of the ball 32. The surface 37 of washer 38 in contact with the ball 32 is a chamfered edge between the lower and side surfaces of the washer 38 and extends all around the circumference of the washer 38 so that this surface 37 is presented to the ball 32 whatever the orientation of the washer 38.

In this Figure the anti-rotational device 20 is in position and one bearing surface 43 can be seen to be in contact with the ball 32. The other two bearing surfaces cannot be seen.

The location of the four points of contact between the ball 32 and upper stage 12 and washer 38 allows sufficient space for the end of the anti-rotational device 20 to move about the ball 32. In addition, the structured cut-outs 30 each have cut-out lobes 31 either side of the ball 32 to allow enough room for the end of the anti-rotational device 20 to manoeuvre. The three bearing surfaces 43A, B, C remain in contact with the ball yet move over the ball to allow the arm of the anti-rotational device 20 to rotate about the ball 32.

In the event of a jolt the bearing surfaces will spring off the ball, hit a solid stop (i.e. the edges of the cut-out structure 30) and return to their position on the ball. The ball joint is thus self-protecting. Where high precision ball joints are required, coil springs may be provided, for example between the two parts of an anti-rotational device 20, to urge the bearing surface (s) onto the ball 32. Such springs would assist in returning the bearing surfaces onto the ball after any jolt and add rigidity to the structure. Such springs would also aid in maintaining the location of the ball with respect to the bearing surface. Thus, as the bearing surfaces wear, the ball would remain (quasi-) kinematically located in position maintaining a constant length of strut. The person skilled in the art will appreciate that biasing means would be advantageous at other locations on an apparatus incorporating a ball joint according to the invention.

In this embodiment, where the ball is retained and supported by the cut-out, the ball remains located with respect to the joint when the strut (or second structure) is not engaged with the ball at the bearing.

The use of a bias ensures that the ball repeatedly contacts the bearing surfaces at the correct location, according to the shape of the bearing surface, to minimise lateral movement of the ball with respect to the second structure as the bearing surface wears. Thus, the active length of a strut 14 or anti-rotational device 20 remains stable over time and with wear of the machine. The active length is the length between the centre of the pivot joints at each end of the structure 14,20. If this active length were not maintained, then after a period of use, the machine would not position itself where dictated by the machine motors as there would be lateral movement in the structure which would not be the same for each joint. For struts 14, this would affect the position of the upper stage 12 in the x, y or z direction. For anti-rotational devices 20, this affects the rotation of the upper stage 12 with respect to the lower fixed stage 10 and the degree of parallelism achieved between the two stages. This pivot joint has the advantages that it is both cheap to manufacture and easy to assemble.

The cut-out structure which holds the ball is easy to machine. Repeatable (kinematic) positioning of a free ball within this structure enables the ball to be easily replaced. This also enables correct geometric positioning of the parts on assembly of the machine.

Furthermore use of commercially available accurate spheres (for example ball bearings) combined with precise positioning in the structure produces a high precision ball joint which ensures a good seating position of the ball within the aperture of the second structure. The ball may be retained in position by clamping, gluing, welding or any other method which maintains the integrity of the ball as a sphere.

An alternative way of urging the bearing surfaces onto the ball 32 is by biasing the second structure 14,20. One way to achieve this is to provide a plate which has one end clamped to the second structure 14,20 and the other end pressing against the ball 32. The plate thus acts like a leaf spring. The clamp is preferably removably fixed by, for example, a screw, to enable removal of the ball 32 for maintenance or replacement thereof. The word plate is intended to include all the various shapes and structures that are suitable for providing a bias such as a washer. Such a plate could be used in conjunction with washer 38 or as a replacement.

When a bias is used, it ensures that all the contact points between the ball and the second (and also third) structures are equally rigid and loaded so all contacts have equal wear rates.

The ball used in the pivot joint may be made of any hard/low friction material or alternatively made of any material coated with a hard/low friction material.

Although the above example describes the use of a pivot joint in a coordinate measuring machine, this pivot joint is not limited to use with such machines and may be used in other applications. Examples of other applications include positioning machines such as robots, machine tools, measuring machines, also non-cartesian mechanisms and other parallel kinematic machines.

Furthermore the invention is not limited to the method of locating a ball as described above. Although the embodiment describes four points of contact with the ball, one of which is adjustable, it is possible to have more than a total of four points of contact with the ball. In addition it is possible to have more than one adjustable point of contact, for example all four points of contact could be adjustable.

Figure 7:
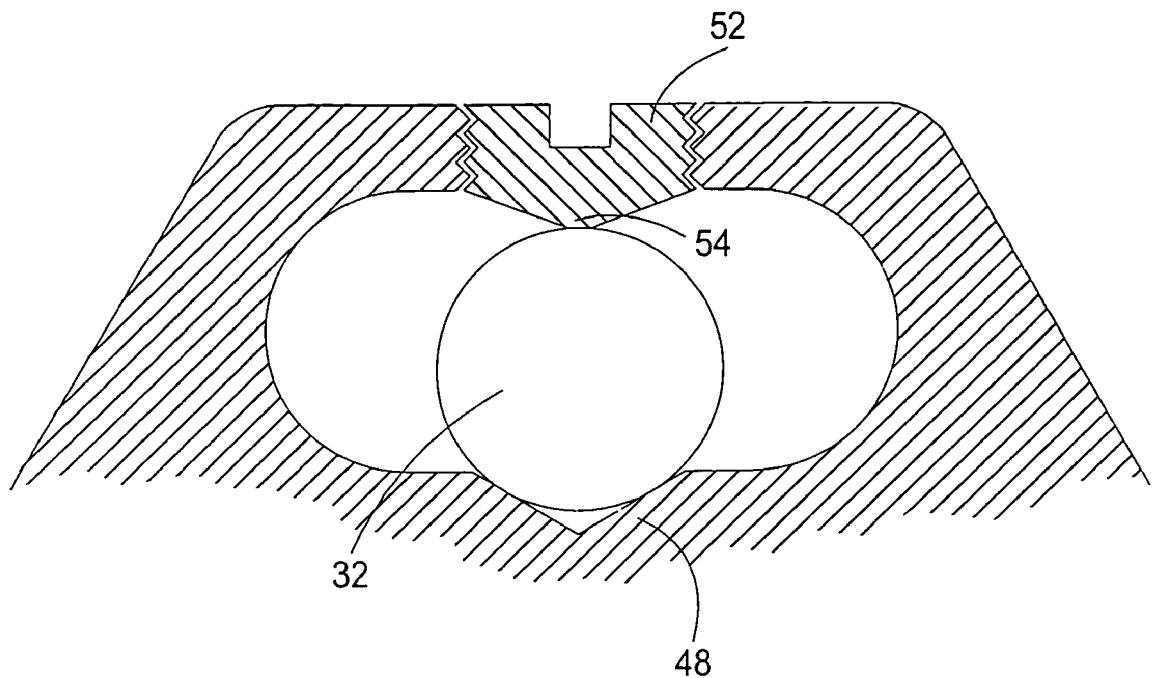
FIGS. 7 and 8 are schematic illustrations of alternative clamping arrangements of a ball in a pivot joint.

An alternative method of clamping a ball rigidly in a precise location is shown in FIG. 7. The ball 32 is located in a conical recess 48 and held in place by a securing device 52 (for example a screw) with one point of contact 54 with the ball 32. Of course the securing device 52 may have more than one point of contact with the ball 32 (for example a v-groove).

Figure 8:
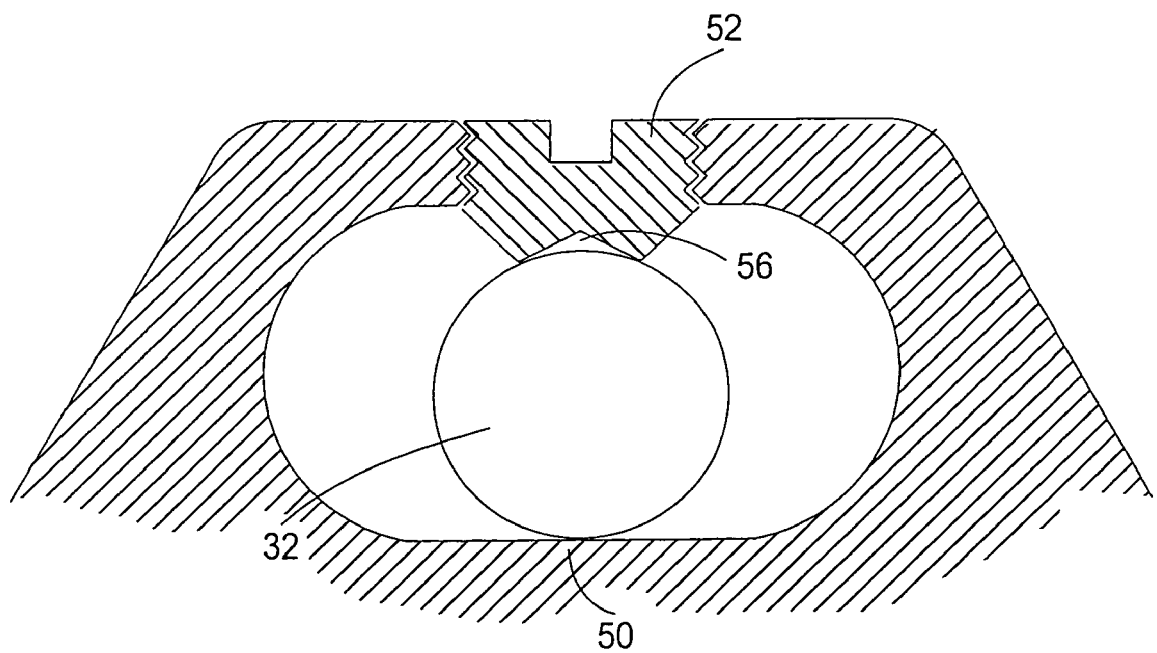

FIG. 8 shows another method of clamping a ball rigidly in a precise location. The ball 32 is located on a flat surface 50 and is held in place by a securing device 52 which has a conical recess 56 in contact with the surface of the ball 32.

The bearing surfaces are preferably sloped, at a shallow angle allowing the ball to sit on the surfaces (see FIG. 6b). An angle of between about 15° and 45° to a line perpendicular to the plane of the bearing surfaces is suitable. Thus, each of the surfaces of the hole adapted to receive the ball describes a cone. The surfaces may describe a single cone or different, non-concentric cones where the contact radius of each cone is greater than the radius of the ball. An angle of less than about 15° may result in the ball becoming jammed in the hole which, of course, affects the mobility of the joint. An angle of greater than about 45° requires increasingly large loads to force the ball to be received in the hole. The preferred angle is about 15-30° with the range of about 15-20° most preferred as this shallow angle provides a good compromise between the sliding action of the bearing surface with respect to the ball and the ease with which the ball is received within the hole. A shallow angle is useful if the bearing surfaces are urged together by a spring as it enables a weaker spring to be used than if steeper angles are used.

As an alternative to using bearing surfaces of one of the structures, a separate bearing is housed between the structures. In this example, it is preferred that in addition to the bearing surface which receives the ball of the first structure being shaped to achieve this, that both the other bearing surface and the communicating surface of the second structure are also so shaped. This shaping assists in maintaining the pivot joint in its location. If the bearing is an air bearing, then the distance between the two structures should be maintained at a substantially constant value thus, the surfaces of the first and second structures which cooperate are required to have co-operating forms. Thus, the ball may float between the receptacle and second structure and spin freely with respect to both.

Regardless of the type of bearing used, it is preferred that the first and second structures are manufactured relative to each other.

For a high precision joint, a bias may be used to force the second structure into contact with the ball. For lower precision applications, this may be dispensed with by carefully selecting the angle of the bearing surface.

Figure 10A:
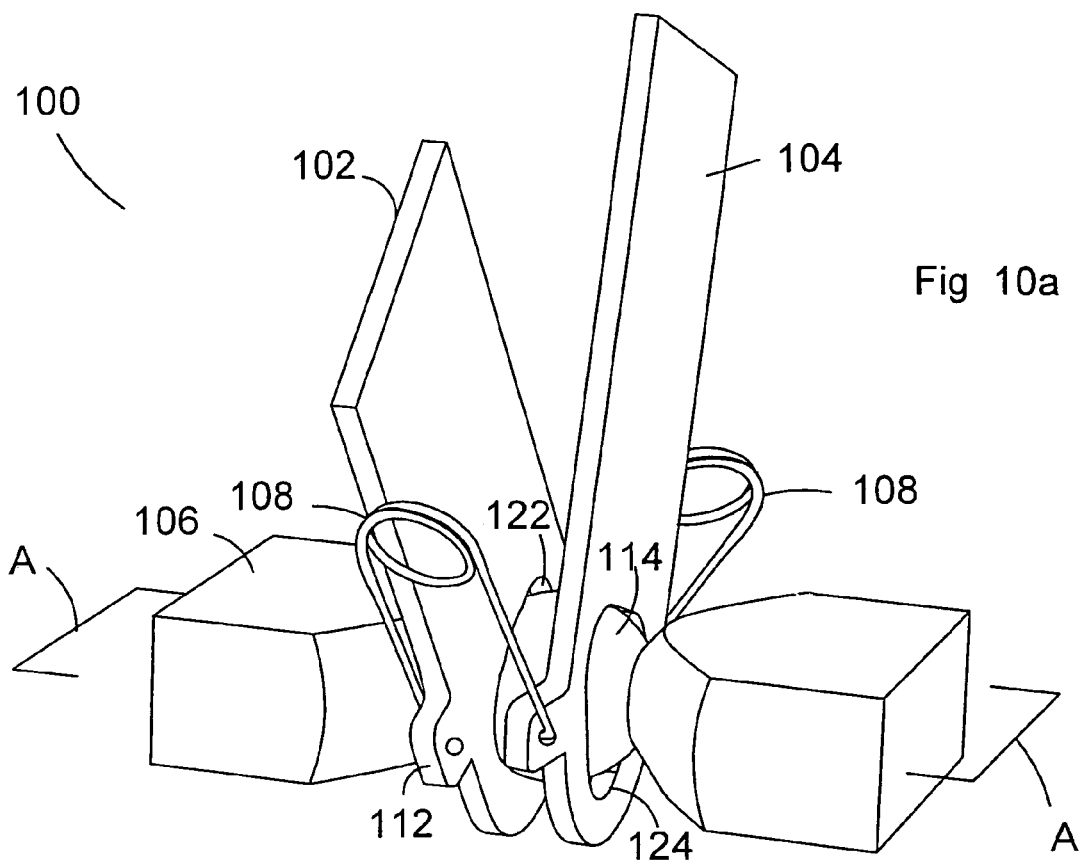
FIGS. 10a, 10b and 10c show isometric views of alternate pivot joints according to the invention.
Figure 10B:
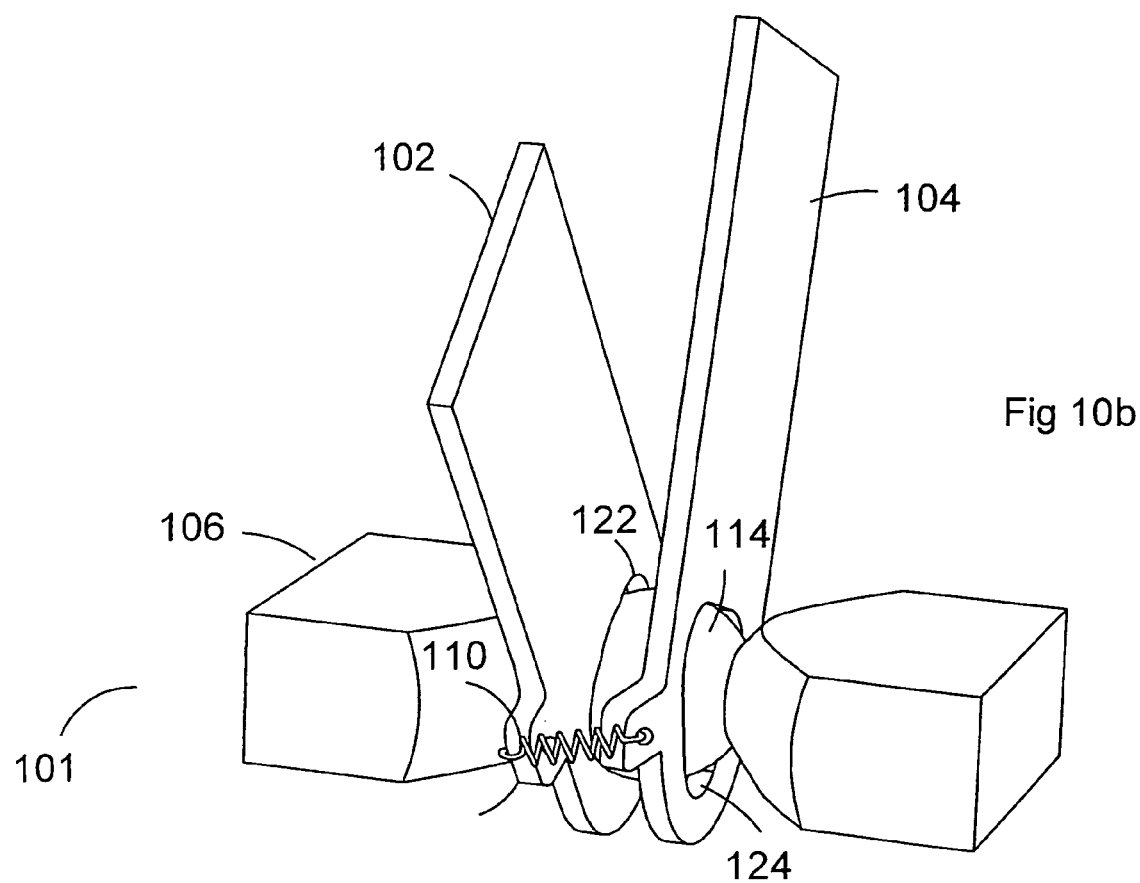

FIGS. 10a and 10b show isometric views of pivot joints 100 and 101 respectively. The first structure is provided by a receptacle 106 for a ball and a ball 114.

Second and third structures are provided by two struts 102,104 which are each provided with a hole 122,124 respectively near an end which partly receive and fit over the ball 114. The two struts 102,104 are located diametrically opposite each other on the ball 114. The distal ends of the second and third structures are also provided with pivot joints. These distal pivot joints can be of the single strut variety or double strut joints where either the same two struts, or one of these struts and a different strut coincide.

Figure 10C:
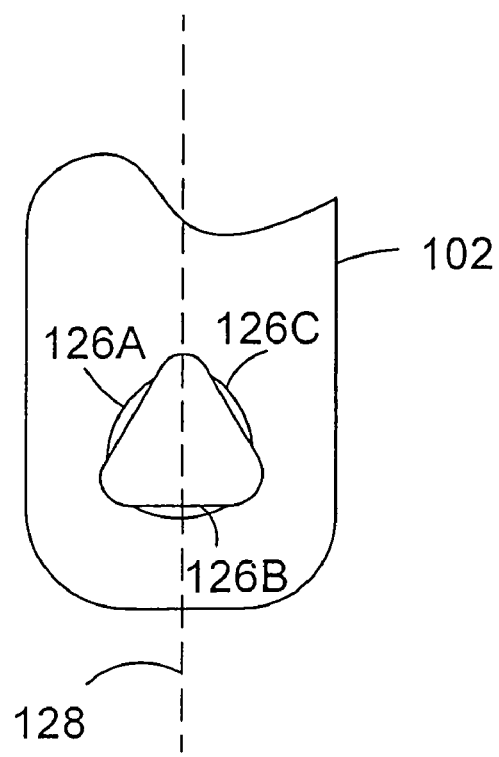

In this example, the holes 122,124 in the struts are each shaped as rounded triangles (see FIG. 10c) in order to provide three bearing surfaces 126A, B, C—one on each side of the triangular structure—in contact with the ball. The bearing surfaces are angled so are not perpendicular to the longitudinal axis 128 of the struts. This allows the ball 114 to be seated (partially) within the holes 122,124.

In order to ensure that the two struts 102,104 each contact the ball at the three bearing surfaces, the two struts are biased together. FIG. 10a shows two u-shaped springs 108 which act on opposite sides of the struts. Each spring 108 connects between a lug 112 on the struts pulling the struts together and the bearing surfaces onto the ball surface. FIG. 10b shows an alternative arrangement where two coil springs 110 are connected across the lugs 112 of the two struts (the second coil spring not shown).

Alternatively, the springs are located between facing sides of the struts either near the holes in the struts or, if a stronger spring is used, about halfway along the length of the struts (this may enable the biasing of both ends of the struts using one spring)

As opposed to using a spring to bias the bearing surfaces into contact with the ball surface, magnetic attraction can be used. Here the lug on each strut houses or includes a magnet. The magnets are positioned such that opposite poles face the gap between the two struts thus the two struts are magnetically attracted and locate correctly around the ball.

As an alternative to the struts being pulled towards each other, the struts can be each be pushed towards the bearing surface and each other by a bias (spring, magnetic force, pressure differential etc) on the receptacle.

Figure 10D:
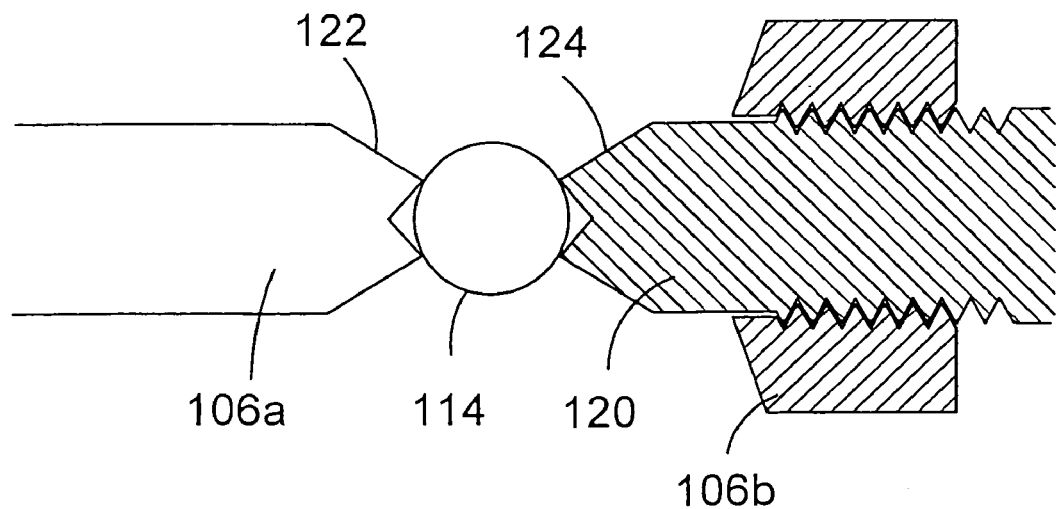

The ball 114 is supported in the receptacle 106 by clamping between two receiving surfaces 132,134 provided on one side by the receptacle 106a (see FIG. 10d) and, at an approximately diametrically opposed point of the ball, by a grub screw 130 which is rotatably mounted within the receptacle 106b. The use of one movable receiving surface 134 enables easy positioning of the ball 114 with respect to the two struts 102,104 and the receptacle 106a,106b. Only the receptacle and ball have been shown in FIG. 10d for clarity.

Alternatively, the ball may be push-fitted into a correspondingly sized gap in the receptacle. Or, the ball may be mounted on a central rod (not shown) which passes through the centre of the ball 114 and into the receptacle 106 on either side of it, the rod exits the receptacle on one side (not shown) and is clamped ensuring that the ball 114 is fixed in the receptacle 106.

A double strut pivot joint such as has been described has a number of applications, one of these is in a coordinate measuring machine. Such a machine comprises two platforms which are linked by at least three struts which are of changeable length. An example is a hexapod which is described more fully in International Patent Application WO95/20747.

The ball may also be held in position by permanent methods such as bonding, braising and welding. However these methods have the disadvantage that the ball is then no longer replaceable.

This pivot joint has the advantages that it is both cheap to manufacture and easy to assemble.

The cut-out structure which holds the ball is easy to machine. Repeatable positioning of a free ball within this structure enables the ball to be easily replaced.

Furthermore use of commercially available accurate spheres (for example ball bearings) combined with precise positioning in the structure produces a high precision ball joint.

The use of the word pivot in the phrase pivot joint throughout this specification is defined as including pivot joints with one, two and three degrees of freedom as well as universal joints having two or three degrees of freedom.

The invention claimed is:

1. A co-ordinate positioning or measuring machine, comprising:
    a first platform;
    a second platform; and
    at least a first strut,
    wherein the first platform is connected to the second platform via the first strut,
    the first platform comprises a first receptacle that retains a first ball, wherein the first ball is held in a fixed location relative to the first receptacle,
    the first strut has a first end defining a first aperture having a peripheral surface, the peripheral surface of the first aperture being mounted on and movable with respect to the first ball.

2. A machine according to claim 1, wherein the second platform comprises a second receptacle that retains a second ball, the second ball is held in a fixed location relative to the second receptacle.

3. A machine according to claim 2, wherein the first strut has a second end defining a second aperture having a peripheral surface, the peripheral surface of the second aperture being mounted on and movable with respect to the second ball.

4. A machine according to claim 1, wherein the first platform comprises a first clamp, the first ball is held in the first receptacle by the first clamp.

5. A machine according to claim 1, wherein the first ball is held stationary relative to the first receptacle.

6. A machine according to claim 1, wherein the peripheral surface of the first aperture comprises at least two spaced apart bearing surfaces in sliding contact with the first ball.

7. A machine according to claim 6, wherein areas of the peripheral surface of the first aperture that are located between the at least two spaced apart bearing surfaces do not contact the first ball.

8. A machine according to claim 6, wherein each bearing surface is angled relative to a line perpendicular to the plane that contains the bearing surfaces.

9. A machine according to claim 1, wherein the peripheral surface of the first aperture comprises three spaced apart bearing surfaces in sliding contact with the first ball.

10. A machine according to claim 1, wherein the first ball comprises a ball bearing made by a lapping process.

11. A machine according to claim 1, wherein the first strut is a telescopic strut that comprises a motor for changing its length.

12. A machine according to claim 1, wherein the first aperture is biased into engagement with the first ball.

13. A machine according to claim 1, wherein a second strut and a third strut are also provided, the first platform also being connected to the second platform by the second strut and the third strut.

14. A co-ordinate positioning or measuring machine, comprising:
    a first platform;
    a second platform; and
    at least a first strut connecting the first platform and the second platform,
    wherein the first platform is attached to the first strut via a first pivot joint, the first pivot joint comprising a first structure and a second structure,
    the first structure comprising a ball and a receptacle, the ball is held in a fixed location relative to the receptacle,
    the second structure defining an aperture having a peripheral surface, the peripheral surface being mounted on and movable with respect to the ball.

15. A machine according to claim 14, wherein the receptacle comprises a cut-out provided on the first platform.

16. A machine according to claim 14, wherein the first strut provides the second structure that defines the aperture.

17. A co-ordinate positioning or measuring machine, comprising:
    a first stage;
    a second stage; and
    a plurality of struts that connect the first stage and the second stage,
    wherein each of the plurality of struts comprises a first end and a second end,
    the first and second ends of each strut are connected to the first and second stages respectively by a plurality of pivot joints,
    each of the plurality of pivot joints comprises a first structure and a second structure, the first structure comprises a ball and a receptacle, the ball being held in a fixed location relative to the receptacle, and the second structure defines an aperture having a peripheral surface, the peripheral surface being mounted on and movable with respect to the ball.

18. A machine according to claim 17, wherein the plurality of struts comprises three struts that connect the first stage and the second stage.

19. A machine according to claim 17, wherein each of the plurality of struts comprises a telescopic strut of changeable length.

20. A machine according to claim 17, wherein the first stage is also connected to the second stage by anti-rotational devices, the anti-rotational devices eliminating the three degrees of rotational freedom between the first and second stages.

* * * * *